(12) United States Patent
Hamm et al.

(10) Patent No.: US 8,727,330 B2
(45) Date of Patent: May 20, 2014

(54) GROUNDING COMPONENT FOR ELECTRIC WELDING SYSTEMS AND METHODS

(75) Inventors: James E. Hamm, Grafton, OH (US); Christopher R. Miller, Swanton, OH (US); Robert Skrjanc, Lorain, OH (US)

(73) Assignee: Emerson Electric Co., St. Louis, MO (US)

( * ) Notice: Subject to any disclaimer, the term of this patent is extended or adjusted under 35 U.S.C. 154(b) by 535 days.

(21) Appl. No.: 13/005,045

(22) Filed: Jan. 12, 2011

(65) Prior Publication Data

US 2012/0175834 A1   Jul. 12, 2012

(51) Int. Cl.
*B23Q 3/00* (2006.01)

(52) U.S. Cl.
USPC ........ 269/293; 269/289 R; 269/290; 269/291; 269/294

(58) Field of Classification Search
USPC ............. 269/293, 289 R, 290, 291, 294, 303, 269/309, 89, 131, 130, 136, 902; 248/177.1, 127, 188
See application file for complete search history.

(56) References Cited

U.S. PATENT DOCUMENTS

| | | | |
|---|---|---|---|
| 798,371 A | 8/1905 | Ward | |
| 1,054,661 A | 3/1913 | Amborn | |
| 1,126,544 A | 1/1915 | Martin | |
| 1,158,414 A | 10/1915 | Amborn | |
| 1,184,991 A | 5/1916 | Pettit | |
| 1,216,610 A | 2/1917 | Rosenbaum | |
| 1,393,766 A | 10/1921 | Charme | |
| 1,634,837 A | 7/1927 | Lee | |
| 1,653,326 A | 12/1927 | Welter | |
| 1,686,023 A | 10/1928 | McCloskey | |
| 1,695,311 A | 12/1928 | Young | |
| 1,812,967 A | 7/1931 | Long | |
| 1,897,449 A | 2/1933 | Trowbridge | |
| 2,191,191 A | 2/1940 | Pealer | |
| 2,297,980 A | 10/1942 | Perkins | |
| 2,666,609 A | 1/1954 | Ingwer | |
| 2,703,027 A * | 3/1955 | Petersen | 269/130 |
| D175,105 S | 7/1955 | Ewing et al. | |
| 2,733,330 A | 1/1956 | Blewett | |
| 2,831,583 A | 4/1958 | Wright et al. | |
| 2,978,114 A * | 4/1961 | Halligan | 108/173 |
| 3,656,439 A | 4/1972 | Domin | |
| 4,083,624 A | 4/1978 | Timmer | |
| 4,133,519 A | 1/1979 | Shin et al. | |
| 4,210,373 A | 7/1980 | McGee | |
| 4,231,557 A | 11/1980 | Blachly et al. | |
| 4,349,931 A | 9/1982 | Leon | |
| 4,715,760 A | 12/1987 | Browning | |
| 5,135,208 A * | 8/1992 | Diskin | 269/130 |
| 6,471,220 B1 | 10/2002 | Babb | |
| 7,430,968 B2 * | 10/2008 | Clark | 108/115 |

(Continued)

OTHER PUBLICATIONS

The Ridge Tool Company, "Price List", Dec. 1, 1939, 13 pages.

(Continued)

*Primary Examiner* — Lee D Wilson
*Assistant Examiner* — Seahee Yoon
(74) *Attorney, Agent, or Firm* — Mark E. Bandy; Rankin, Hill & Clark

(57) ABSTRACT

A variety of work stands and support assemblies for supporting workpieces such as pipes, are described. The work stands include a base plate and a welding stand-off or grounding lug, at which an electrical grounding cable can be readily attached.

21 Claims, 9 Drawing Sheets

(56) References Cited

U.S. PATENT DOCUMENTS

| | | |
|---|---|---|
| 2007/0080268 A1 | 4/2007 | Worrell |
| 2008/0029662 A1 | 2/2008 | O'Rourke |
| 2009/0121405 A1* | 5/2009 | Brown et al. ............... 269/216 |

OTHER PUBLICATIONS

The Ridge Tool Company, "Genuine Ridgid Work-Saver Pipe Tools", Catalog, Aug. 7, 1961, pp. 1-28.

Emerson Professional Tools, "Portable Tristand Vises", website http://www.ridgid.com/Tools/Portable-Tristand-Vises, Feb. 9, 2010, 1 page.

Ridge Tool Company, "Ridgid Tristand Chain Vise", Catalog p. 999-998-422.10, Aug. 2004, 1 page.

Ridge Tool Company, "Ridgid Adjusting Tri-Stand Leg Stiffness", Catalog p. 999-998-461.10, Jul. 1998, 1 page.

Ridge Tool Company, "Ridgid Assembling Tri-Stand Legs and Tray", Catalog page, 1 page, Jan. 21, 2011.

Berkley Tool Pipemaster, Catalog, 24 pages, Jan. 21, 2011.

Steel Dragon Tools, "SDT 460 ⅛"-6" Tri Stand Chain Vise fits Ridgid 72037", website http://www.steeldragontools.com/item-detail.php-?pid=70, Feb. 9, 2010, 6 pages.

Steel Dragon Tools, "BC-610 Portable Bench Pipe Chain Vise SDT 40210", website http://www.steeldragontools.com/item-detail.php-?pid=64, Feb. 9, 2010, 3 pages.

Reed Pipe Tools & Vises, "Tripods—R450+, R470+, R40+", website http://www.reedmfgco.com/index.html?screen=tripods_r450_r470_r40, Feb. 9, 2010, 1 page.

Reed Pipe Tools & Vises, "Chain Vises", website http://www.reedmfgco.com/index.html?screen=chain_vises, Feb. 9, 2010, 1 page.

Maxpower Tools for Industry, "Max-Stand Chain Vise", website http://www.worldclasstoolsource.com/chain-vise.htm, Feb. 9, 2010, 1 page.

Silom, "Products : Vices & Workbench", website http://www.silom.co.uk/php/products.php?categoryid=1340, Feb. 9, 2010, 3 pages.

Rothenberger, "Vises & Pipe Stands", website http://www.rothenbergertools.us/471.html, Feb. 9, 2010, 2 pages.

Wheeler-Rex, "Pipe Working Tools", Catalog, Jan. 1, 2009, pp. 40-41.

* cited by examiner

GROUNDING COMPONENT FOR ELECTRIC WELDING SYSTEMS AND METHODS

FIELD OF THE INVENTION

The present invention relates to grounding components for electric welding systems and related methods. The grounding components are utilized in a wide array of vises, vise stands, and other assemblies for supporting workpieces such as pipes.

BACKGROUND OF THE INVENTION

Arc welding is one of several fusion processes for joining metals. By applying intense heat, metal at a joint between two parts is melted and caused to intermix. Mixing typically occurs with an intermediate molten filler metal. Upon cooling and solidification, a metallurgical bond is formed.

In arc welding, the intense heat necessary to melt metal is produced by an electric arc. The arc is formed between the workpiece and an electrode, typically in the form of a stick or wire that is manually or mechanically guided along the joint. The electrode can be in the form of a rod which serves to carry the electrical current between the rod tip and the workpiece. Or, the electrode may be a specially prepared rod or wire that not only conducts the current but also melts and supplies filler metal to the joint. Most welding in the manufacture of steel products uses the second type of electrode, i.e. a "consumable electrode."

An arc welding circuit including an AC or DC power source and appropriate controls, is connected by a work or grounding cable to the workpiece and by a "hot" cable to an electrode holder of some type. The electrode holder makes electrical contact with the welding electrode.

When performing arc welding upon a workpiece, the workpiece is typically supported on one or more work stands. This is desirable so that the workpiece is not contacted with water or other fluids on the ground, and to improve accessibility to the workpiece for the operator. Upon placing the workpiece on one or more stands, and prior to performing an electric welding operation, it is necessary to establish a grounding path for the grounding or work cable. Although the grounding cable and its associated clamp can be attached to the workpiece itself, this is not desirable for many applications. For certain welding operations or for certain types of workpieces such as pipes, it is typically necessary to periodically move or rotate the workpiece relative to the work stand(s). This may be necessary to expose new regions of the workpiece and/or joint for welding. If the grounding cable is attached to the workpiece, workpiece movement can disrupt the electrical connection established at the interface of the workpiece and grounding cable. In addition, the grounding cable can interfere with placement of the workpiece on the work stand(s), and in particular, can wind around or otherwise become entangled with the workpiece. As will be appreciated by those skilled in the art, this is undesirable. In fact, many electric welding equipment suppliers provide strict instructions for cabling practices and placement of cables that warn against these scenarios.

In view of these concerns, artisans have proposed various provisions for facilitating attachment of grounding cables to support members which support workpieces to be welded. In addition to the use of readily attachable clamps, various mechanical assemblies have been devised for attaching grounding cables to electrical grounding components (or vise-versa) provided on support members. These assemblies ensure reliable electrical connection at a clamp or support member by an electric arc welder power source. The grounding circuit is completed by physical contact between the workpiece, i.e. pipe, and the clamp or support member.

Although satisfactory in many regards, problems can arise if a relatively large number of mechanical interfaces or electrical discontinuities exist between the workpiece and the grounding cable. If excessive, the electrical resistance between the workpiece and the grounding cable can be impeded and detrimentally affect the welding operation. In addition, gaps between components along the grounding path between workpiece and grounding cable can produce sparks or arcing which, as will be appreciated, are not desirable. Accordingly, it would be desirable to provide provisions and a strategy for further reducing mechanical interfaces and electrical discontinuities along a grounding path and thereby reduce the potential for the occurrence of sparks or arcing.

Another concern associated with electric welding of supported workpieces relates to shifting of the workpiece on one or more support members such as work stand(s). Shifting loads can cause distortion along mechanical interfaces and create or change separation distances along an interface. This in turn, can increase the potential for arcing or sparking, which as previously explained is undesirable. Accordingly, a need exists for a support assembly that is less susceptible to changing and distorting mechanical interfaces along a grounding path upon shifting or changing loads.

SUMMARY OF THE INVENTION

The difficulties and drawbacks associated with previously known systems are addressed in the present method and apparatus for a grounding component for a pipe vise assembly and stands using such vises and components.

In one aspect, the present invention provides a work stand comprising a base plate, vise provisions for releasably engaging a workpiece, and a grounding lug in electrical communication with the vise provisions. The grounding lug is adapted to receive an electrical grounding cable clamp.

In another aspect, the present invention provides a work stand comprising a base plate defining a work surface, an oppositely directed underside, and a vise base. The work stand also comprises a grounding lug defining a proximal end, a distal end, and an intermediate portion extending therebetween. The grounding lug is secured to the base plate along the proximal end of the grounding lug. The grounding lug defines an aperture near the proximal end of the grounding lug that is sized and shaped to fittingly engage a chain adapted for use with the vise base.

In still another aspect, the invention provides a work stand comprising a base plate defining a work surface, and an oppositely directed underside. The work stand also comprises vise provisions adapted for retaining a workpiece, the vise provisions including a chain, vise base, and an adjustment assembly for taking up slack in the chain. And, the work stand comprises a support member disposed on the vise base, the support member defining a workpiece contacting face and a grounding lug.

In yet another aspect, the invention provides a work stand comprising a base plate defining a work surface and an oppositely directed underside. The work stand also comprises a plurality of legs engaged to the base plate, extending from the underside, and positionable between an extended position and a retracted position. And, the work stand comprises a grounding lug extending from the underside of the base plate.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

Figure 1:
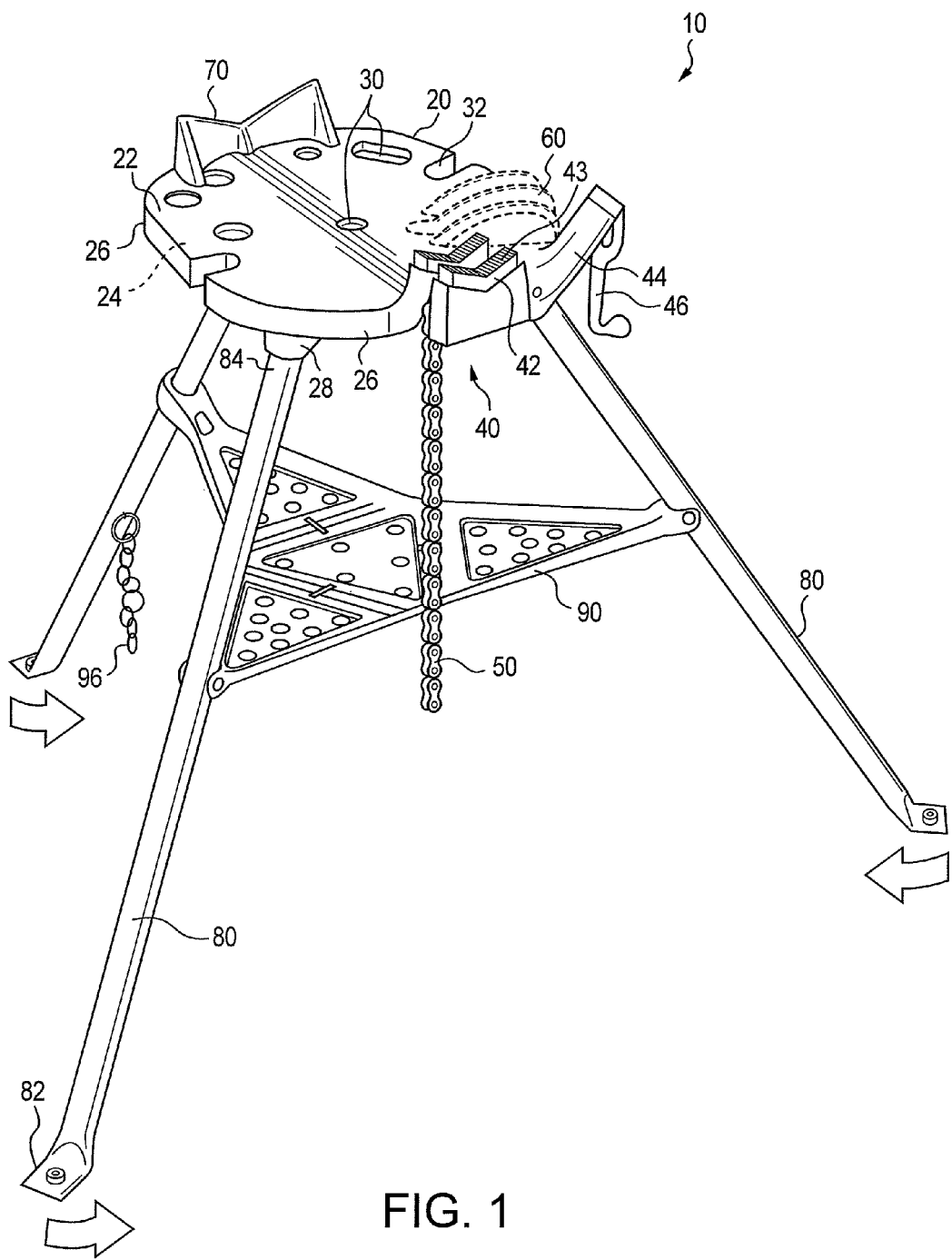
FIG. 1 is a perspective view of a preferred pipe vise stand suitable for use with a preferred embodiment pipe support member and grounding lug in accordance with the present invention.

The present invention provides a work stand and various versions of grounding lugs in association with the work stand. The work stand comprises a base plate to which the grounding lug(s) are affixed. The grounding lug(s) provide convenient and improved reliable electrical communication to the base plate and components thereof such as support members or vise components. In certain embodiments, the grounding lug is integral with a V-shaped support member that contacts the base plate. In yet other embodiments, the grounding lug is engaged to the base plate and preferably along the underside of the base plate. These and other aspects are all described in greater detail herein.

Generally, the work stand includes a base plate and a welding stand-off or grounding lug. Specifically, the base member defines a work face and a region adapted for supporting a workpiece. The work stand in certain versions, also includes a workpiece support member that is selectively attachable to and removable from the base member. The support member includes a central portion and at least two laterally extending members. The support member defines a workpiece engaging face. The welding stand-off or grounding lug projects from one of the base member or the support member. The work stand also preferably includes a collection of extendable legs that are movably attached to the base member. Most preferably, the legs are positionable between an extended position and a retracted position. The work stand is preferably in the form of a pipe vise stand. In other versions of the work stand, vise provisions such as a vise base are provided that are integral with the base plate. And a grounding lug is provided that is non-integral and removable from the base plate.

The grounding lug can have a variety of different forms so long as the stand-off or lug projects or extends outward in such a manner that the stand-off or lug is at least partially exposed and accessible by a cable clamp as typically used with conventional arc welders. The stand-off or lug may be in the form of a planar member having a square or rectangular cross section, a cylindrical rod-shaped member having a circular cross section, or some other shape and corresponding cross section.

The grounding lug is preferably formed from metal and as appreciated, is electrically conductive. The stand-off or lug may include one or more recessed, grooved, serrated, and/or textured regions for facilitating gripping and engagement by a welding cable clamp. For example, preferably defined along a distal end of the stand-off or lug, a recessed region may be provided. Alternatively or in addition, an enlarged or bulbous region or member can be provided along a portion of the stand-off and preferably proximate the distal end of the stand-off. The stand-off or lug may also include one or more coatings along its exterior or outer surface for promoting resistance to corrosion or other environmental factors.

The grounding lug is preferably sized and shaped so as to be graspable by a welding cable clamp as known in the art. These clamps are typically in the form of biased engagement members having a handle end at which the welding cable is attached, and an opposite engagement end at which a pair of jaws is spring biased to a closed position. The grounding lugs are preferably sized such that a welding cable clamp can be readily engaged therewith by opening the jaws and positioning the lug between the spaced apart jaws. The spring biased jaws are then closed about the grounding lug whereby the clamp contacts and provides electrical communication between the cable attached at its handle and the grounding lug gripped by the clamp jaws.

Specifically, in one embodiment, the present invention provides a support member and grounding lug. The support member is adapted for contact and engagement with a base plate. The grounding lug is preferably integral with the support member. However, the invention includes configurations in which the grounding lug is non-integral and separate from the support member. The support member is adapted for contacting, gripping, and supporting a workpiece and preferably a pipe. The support member is preferably configured to be received by a base plate of a work stand, such as a vise stand. The base plate includes an upwardly directed work face and one or more regions for supporting the workpiece. The base plate can in other embodiments, include a collection of extendable legs. In such an embodiment, the base member and legs can serve as a work stand. If the base member includes engageable jaws, the work stand can be in the form of a vise stand.

Preferably, in this version of the present invention using one or more removable support members, the support member provides a face adapted for contacting and engaging a workpiece such as a pipe. The support member is preferably configured, i.e. sized and shaped, to be positioned and disposed on a workpiece supporting region of a base member such as used in a vise stand. The support member is preferably removable from, and non-integral with, the base member. However as noted, the invention includes embodiments in which the support member is integral or otherwise permanently affixed to or with the base member. The support member includes a welding stand-off or grounding lug projecting from the support member. In yet another preferred embodiment, the welding stand-off or grounding lug is selectively removable from and attachable to the base member such as used in a vise stand.

A preferred embodiment support member is a V-shaped support member having a central portion and at least two members extending outward from the central portion at an angle with respect to each other of from about 30° to about 160°. The at least two members define a workpiece engaging face. The preferred support member also includes a welding stand-off or grounding lug projecting from at least one of the central portion and the member(s) extending therefrom.

Specifically, in other embodiments of the invention, the grounding lug is accessible along an underside of the base plate. That is, a downwardly extending member or portion of the grounding lug located under the base plate provides a convenient location for attaching a welding cable. Moreover, by locating the grounding lug under the base plate, engagement with a welding cable is protected. When used in combination with a chain vise or a work stand having a chain vise, it is particularly preferred to provide electrical communication between (i) the grounding lug and the serrated teeth of a pipe support member, and also between (ii) the grounding lug and the chain which typically contacts a pipe or other workpiece disposed on the pipe support member. Providing electrical grounding communication through the serrated teeth is beneficial because upon tightening the chain about a pipe, the serrated teeth tend to pierce through any coatings typically residing along an outer surface of a pipe being retained by the chain. These aspects and in particular, the various preferred embodiments of grounding lugs are further described and illustrated in the referenced figures as follows.

The grounding lug can be integrally formed with the base plate or preferably, separate yet attachable to the base plate. Although the grounding lug is in many applications preferably accessible along the underside of the base plate, the invention includes other locations of the grounding lug, such as along a side region or top surface of the base plate.

FIG. 1 illustrates a preferred pipe vise stand for use with a preferred embodiment pipe support embodiment pipe support member and grounding lug as described herein. The preferred pipe vise stand 10 comprises a base plate 20 defining a work face 22, an oppositely directed underside 24, and a peripheral edge 26 extending between the work face 22 and the underside 24. Provided along the underside 24 of the base plate 20, one or more leg receptacles 28 are located for receiving corresponding legs described herein. The base plate 20 defines one or more apertures 30 and one or more edge slots 32. The base plate 20 may also include a lip extending at least partially around the base plate 20.

The pipe vise stand 10 also comprises vise provisions 40 which typically include a vise base 42 defining an upwardly directed face 43. The vise provisions 40 also typically include a handle base 44 and a corresponding handle 46. The vise provisions 40 are utilized to engage a chain 50 which is positioned about a workpiece (not shown) supported on the face 43 of the vise base 42. The vise stand 10 may also optionally comprise a pipe bender such as pipe bender 60 depicted in FIG. 1 in dashed lines. The pipe bender 60 can be integrally formed as part of the base plate 20 and provides one or more curved mandrel surfaces for manually bending pipe or tubing against. The vise stand 10 also comprises one or more uprights 70 generally spaced from and located across the work face 22 of the base plate 20, opposite from the vise provisions 40. As noted, the pipe vise stand 10 also comprises one or more legs 80, and preferably three. Each leg 80 defines a distal end 82 and an opposite proximal end 84. The legs 80 are movably coupled or engaged with the base plate 20. The proximal end 84 of each leg 80 is received and retained in a corresponding receptacle 28 along the underside 24 of the base plate 20. Preferably, the collection of legs 80 are positionable between an extended position as shown in FIG. 1 and a retracted position in which the stand 10 is more readily transportable. The pipe vise stand 10 may also comprise a tray assembly 90 engaged to each of the legs 80 at a location between the distal and proximal leg ends 82 and 84. One or more fasteners 96 can be provided on the legs 80 to wrap about the legs 80 when the legs are retracted.

Figure 2:
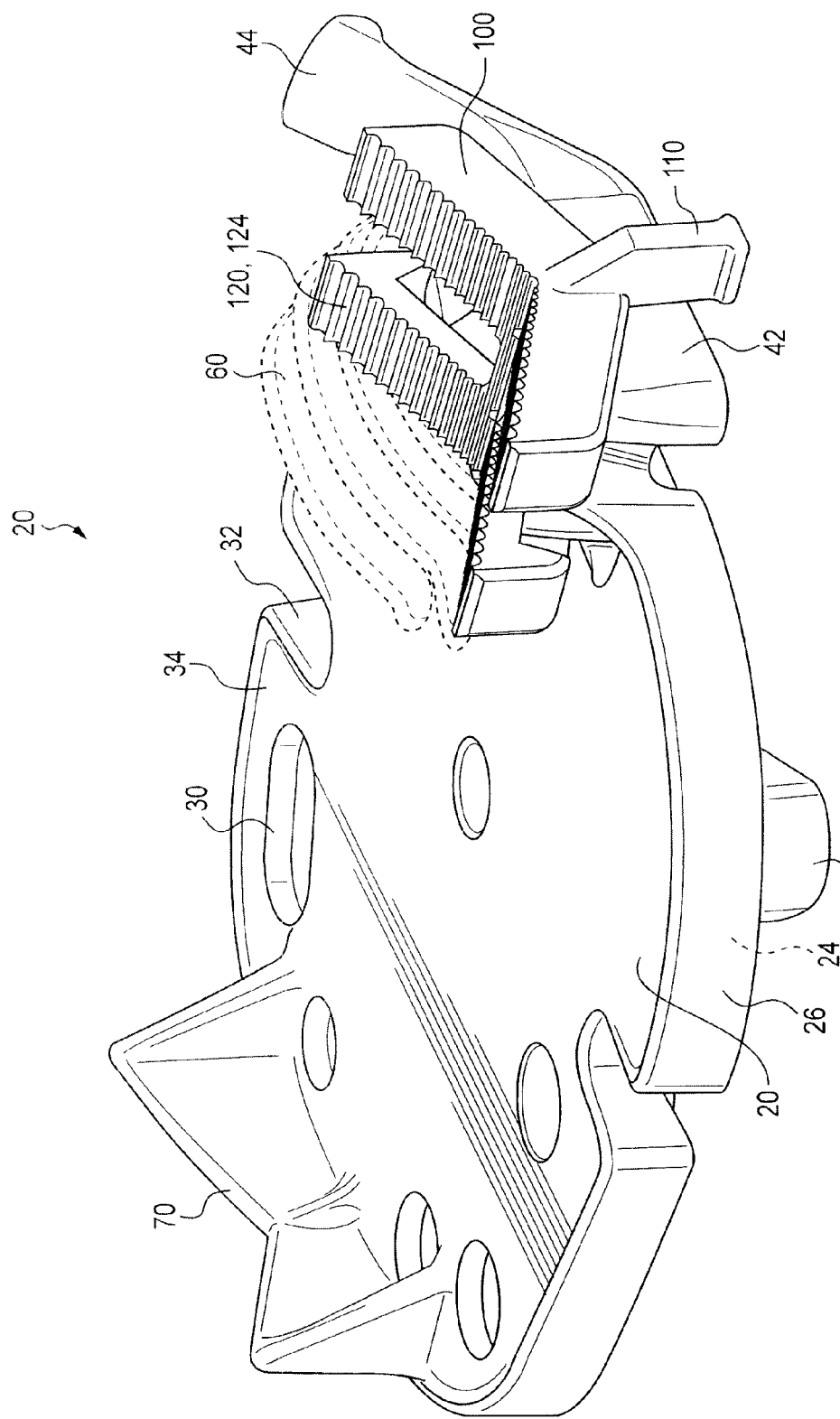
FIG. 2 is a perspective view of a preferred base plate used in the stand illustrated in FIG. 1 and a preferred pipe support member having a preferred embodiment grounding lug in accordance with the present invention.

FIG. 2 illustrates the base plate 20 of the pipe vise stand 10 depicted in FIG. 1 having a pipe support member 100 disposed on the vise base 42. The pipe support member 100 defines an upwardly directed pipe engaging face 120. The pipe support member 100 includes a grounding lug 110. One or more serrations 124 or raised ridges are preferably provided along the upwardly directed face 120 of the pipe support member 100. As will be appreciated, the serrations 124 and clamping or tension from the vise promote engagement and contact between the pipe support member 100 and a workpiece (not shown) disposed thereon. FIG. 2 illustrates in greater detail, the various aspects and provisions of the base plate 20 shown in FIG. 1. For example, a lip 34 is depicted that extends around a majority portion of the periphery of the base plate 20.

Figure 3:
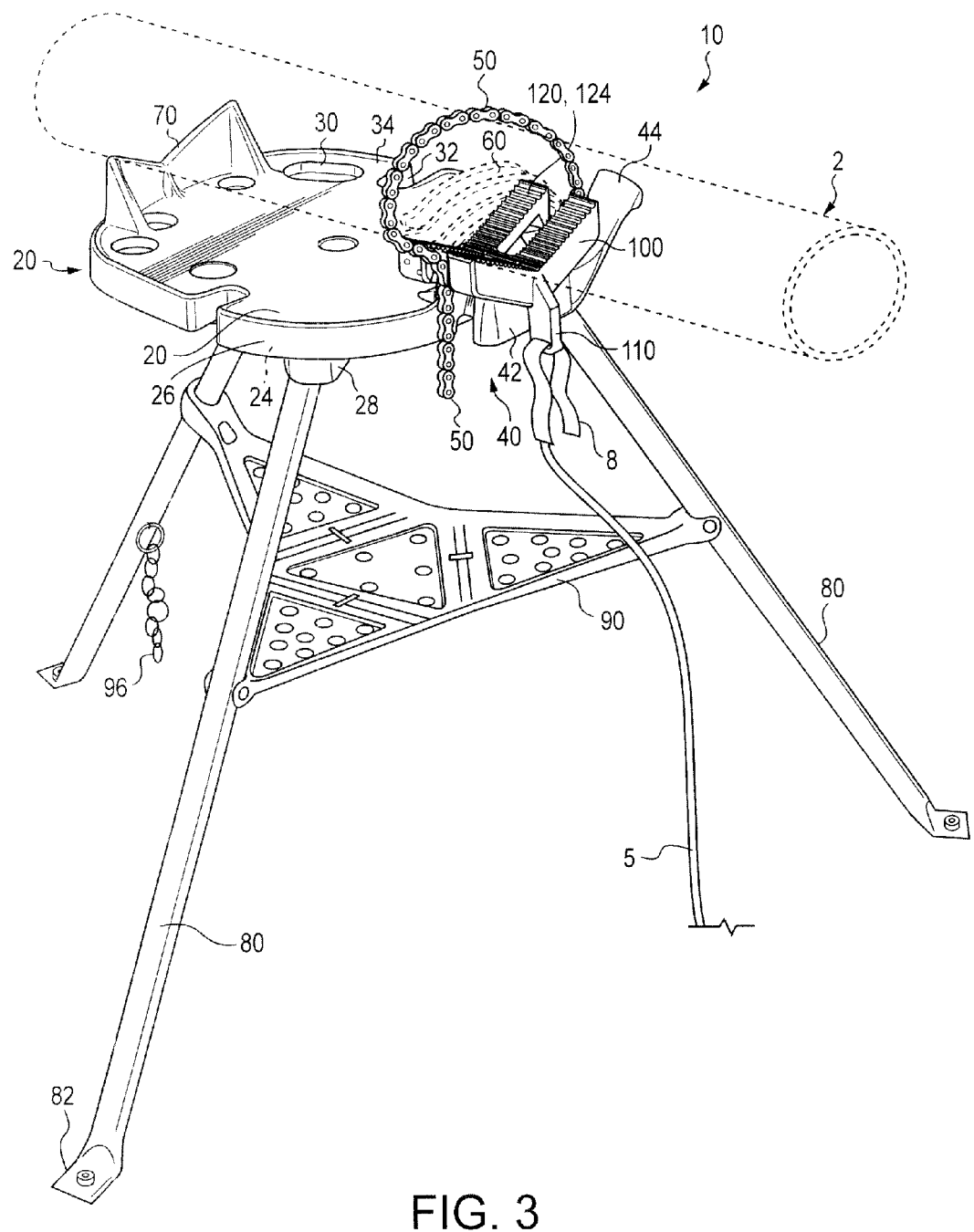
FIG. 3 is a perspective view of the preferred stand shown in FIG. 1 with the pipe support member and grounding lug shown in FIG. 2 supporting a pipe and having an electrical ground connection attached thereto.
Figure 5:
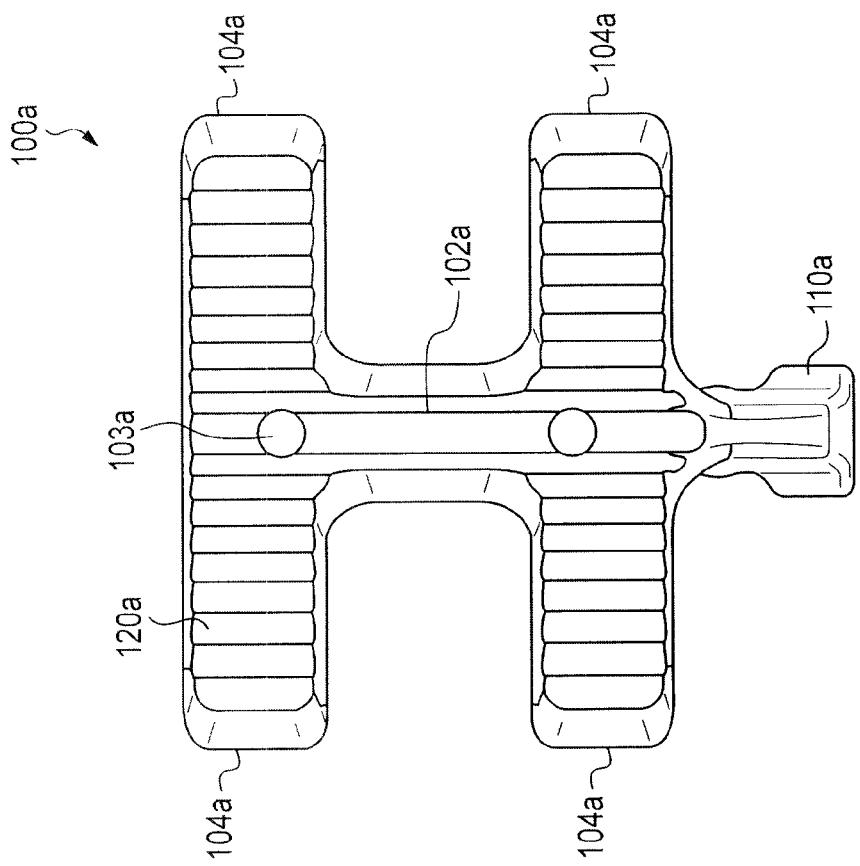
FIG. 5 is a planar top view of the preferred pipe support member of FIG. 4.
Figure 4:
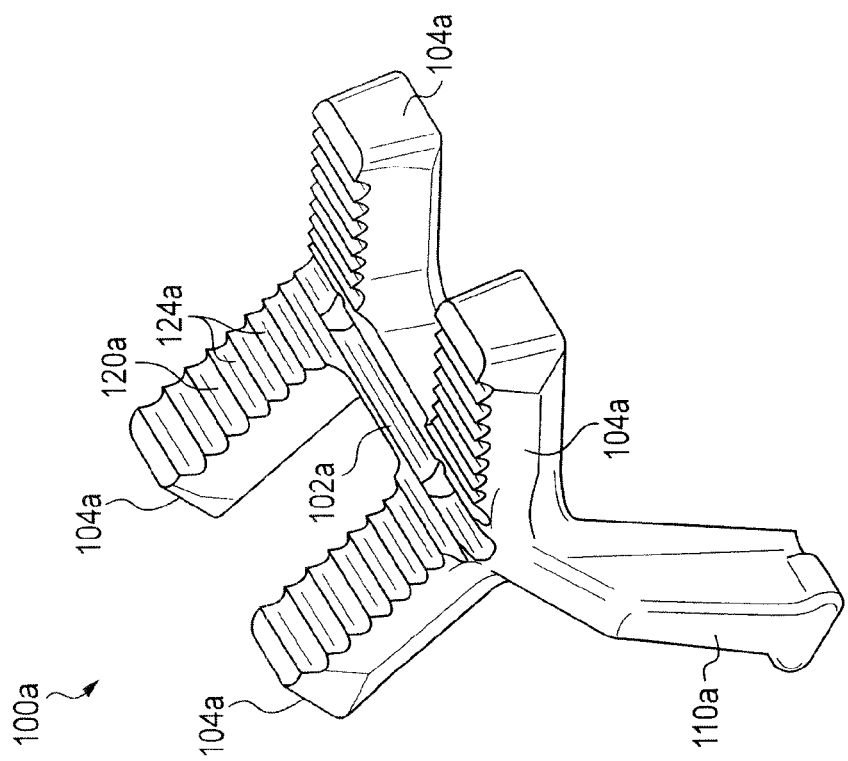
FIG. 4 is a detailed perspective view of another preferred embodiment pipe support member having a preferred grounding lug in accordance with the invention.

FIG. 3 illustrates the pipe stand 10, base plate 20, and pipe support member 100 used for supporting a pipe 2 such as during a welding operation. A cable clamp 8 is releasably attached to the grounding lug 110 of the pipe support member 100. The clamp 8 provides electrical communication to a cable or other electrical conductor 5.

Figure 7:
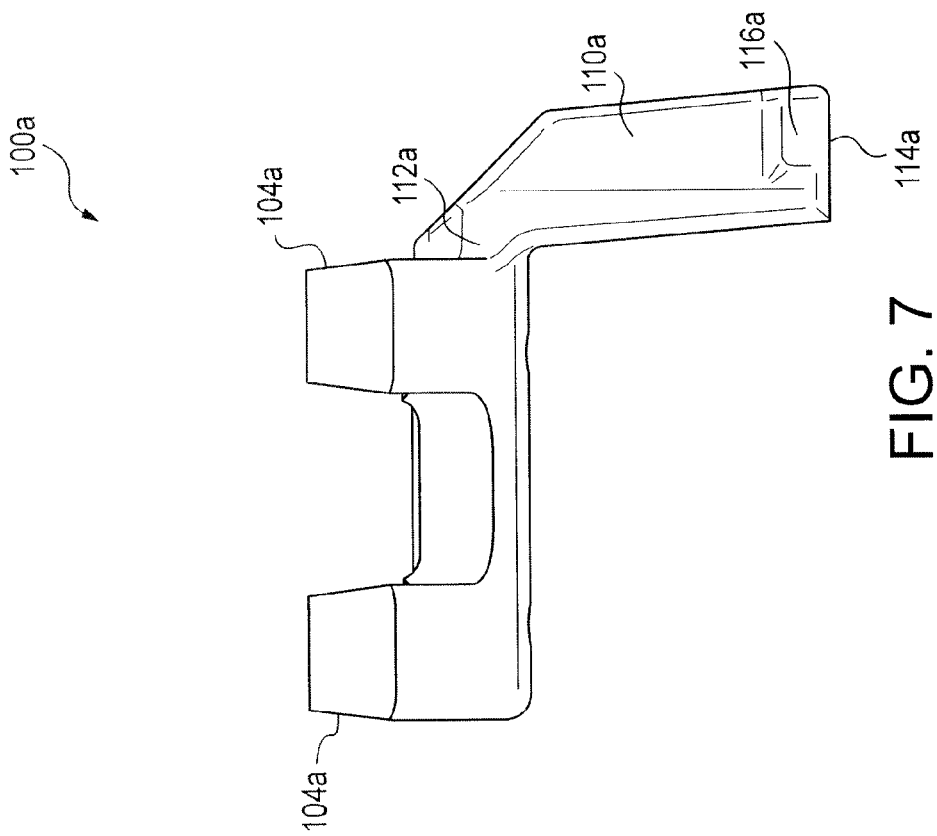
FIG. 7 is a side elevational view of the preferred pipe support member of FIG. 4.
Figure 6:
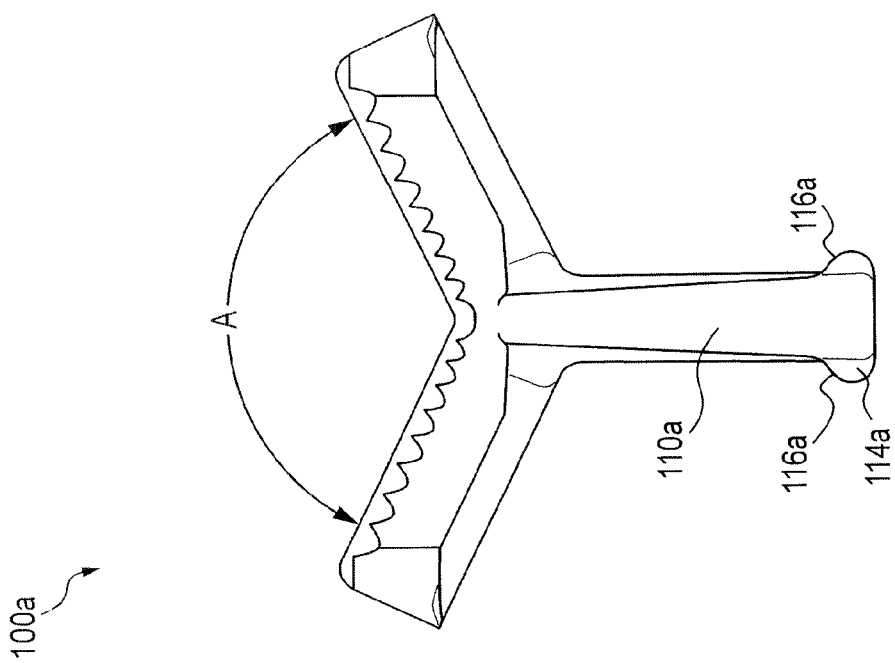
FIG. 6 is an end view of the preferred pipe support member of FIG. 4.

FIGS. 4-7 illustrate another preferred embodiment pipe support 100a in accordance with the invention. The pipe support member 100a includes a central member 102a and one or more outwardly extending lateral members 104a. Preferably, the lateral members 104a extend at an angle A relative to one another as shown in FIG. 6. Generally, angle A is less than 180°, preferably from 30° to 160°, and most preferably from 100° to 150°. The grounding lug 110a extends from one or more of the central member 102a and the lateral members 104a. Preferably, the grounding lug 110a is integrally formed as part of the pipe support member 100a. The grounding lug 110a defines a proximal end 112a at which the lug 110a extends from the central member 102a and/or the lateral members 104a. The grounding lug 110a also defines a distal end 114a. As will be understood, a grounding cable clamp is attached to the lug 110a and preferably along the distal end 114a of the lug 110a. Although a distal end 114a of the lug 110a may be provided in a variety of different forms, shapes, and configurations; an enlarged bulbous region is preferred for promotion of cable clamp retention. It is also contemplated that the pipe support member 100a may include provisions for engagement with one or more fasteners such as threaded bolts. For example, the distal end 114a of the lug 110a could define an aperture extending through the lug 110a for receiving a bolt for a bolted connection to an electrical grounding member. The distal end 114a may include one or more outwardly extending flared regions 116a as shown in FIGS. 6 and 7. One or more apertures 103a can be defined in the support member 100a, and preferably in the central region 102a for receiving threaded fasteners or other engagement members for affixing the support member 100a to a base plate such as base plate 20 depicted in FIG. 2 and specifically, upon the face 43 of the vise base 42. As noted, the support member 100a can also include one or more serrations 124a or raised ridges along the upwardly directed face 120a of the member 100a.

Figure 8:
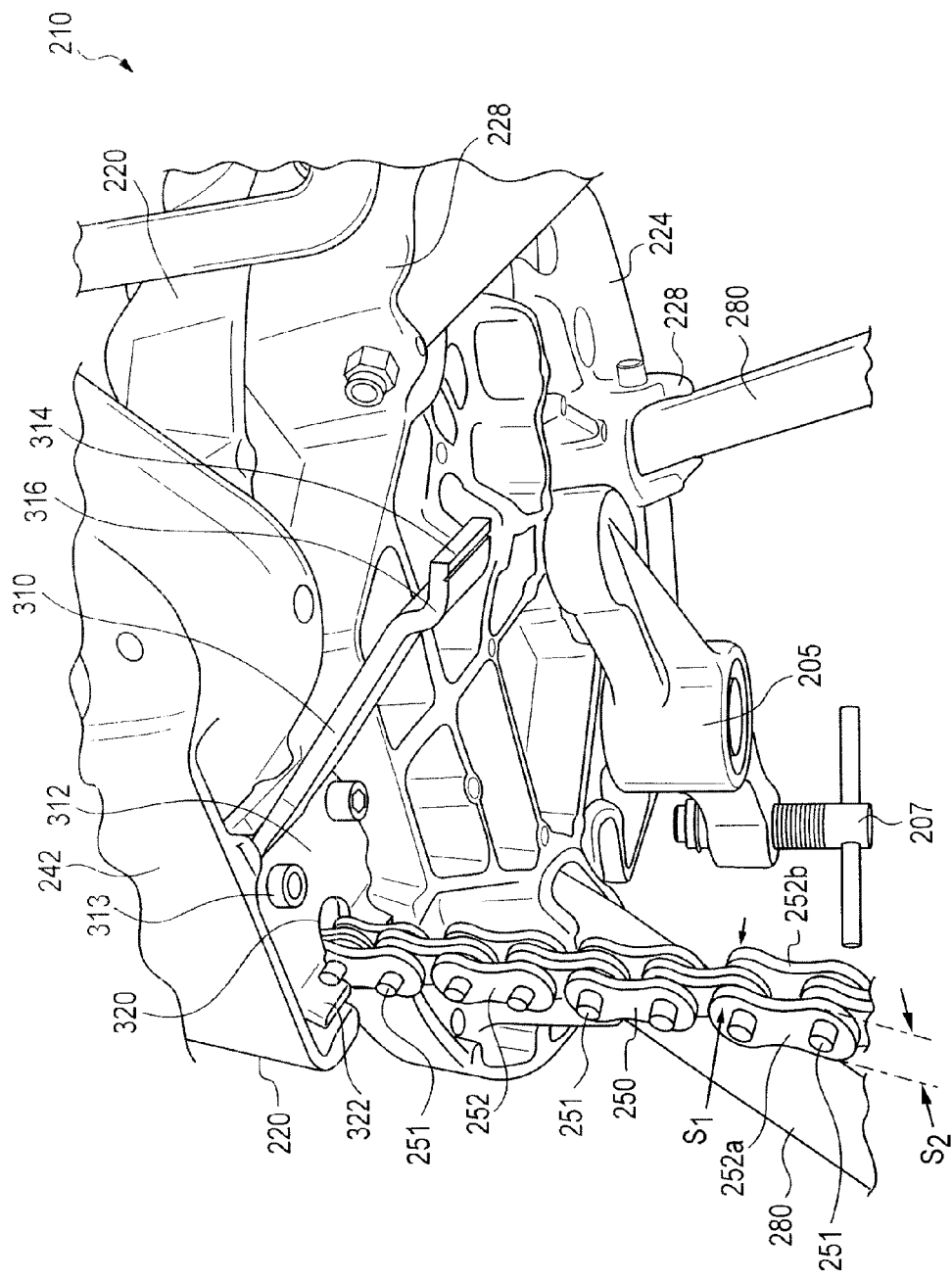
FIG. 8 is a partial perspective view of an underside of a base plate illustrating another preferred embodiment grounding lug in accordance with the present invention.

As previously noted, the invention provides various forms of grounding lugs for use in association with work stands and vises such as chain vises adapted for retaining pipes. A particularly preferred version of a grounding lug, described in conjunction with a pipe vise stand, is depicted in FIG. 8. FIG. 8 illustrates an underside 224 of a base plate 220 of another pipe vise stand 210. The vise stand 210 includes a plurality of legs 28C), each releasably engaged within a corresponding leg receptacle 228 provided along the underside 224 of the base plate 220. The pipe vise stand 210 generally corresponds to the previously described stand 10 and includes a chain 250 and other provisions. The chain 250 comprises a plurality of spaced apart plates 252 hingedly attached to adjacent pairs of plates by posts 251. The pipe vise stand 210 also comprises a jackscrew extender 205 engaged along the underside 224 of the base plate 220. The jackscrew extender 205 includes a jackscrew 207 and positions the jackscrew laterally beyond an outer edge of the base plate 220.

Figure 11:
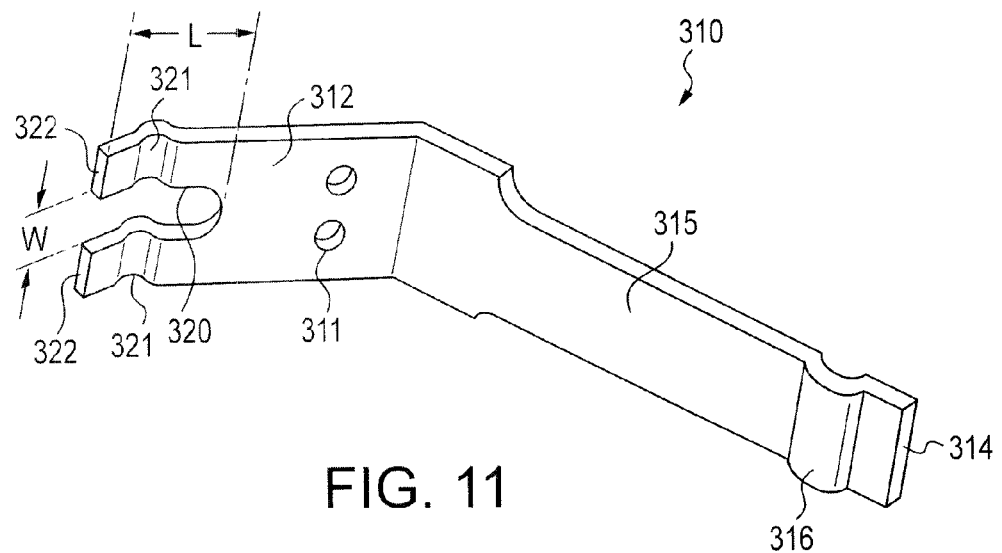
FIG. 11 is a perspective view of the preferred embodiment grounding lug of FIG. 8, shown in isolation.
Figure 12:
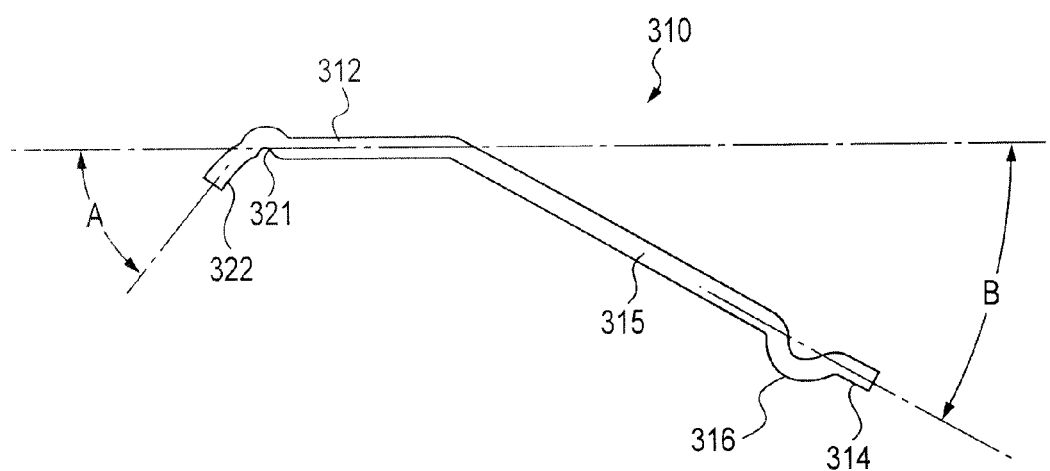
FIG. 12 is a side view of the preferred embodiment grounding lug shown in FIGS. 8 and 11.

The pipe vise stand 210 comprises a preferred embodiment grounding lug 310 that extends from the underside 224 of the base plate 220. FIGS. 11 and 12 illustrate the grounding lug 310 in isolation. The grounding lug 310 defines a proximal end 312 and an opposite distal end 314. The grounding lug 310 includes an intermediate portion 315 extending between the ends 312 and 314. The grounding lug 310 preferably includes provisions for removably attaching the grounding lug 310 to the underside 224 of the base plate 220. For example, the grounding lug 310 can define one or more apertures 311 along its proximal end 312. Corresponding fasteners 313 such as threaded members can be used to thereby engage and establish contact and electrical communications between the grounding lug 310 and the base plate 220. Preferably, the grounding lug 310 is attached to the base plate 220 at a location proximate and most preferably directly under, the vise base 242. Thus, upon positioning a workpiece (not shown) on an upwardly directed face (not shown) of the vise base 242, the grounding path to the distal end 314 of the grounding lug 310 is direct and of relatively short distance. Preferably, the grounding lug 310 is engaged to the underside of the base plate 220 by one or more fasteners such as fasteners 313 which also serve to contact and engage a pipe support member such as previously described member 100 or 100a. This configuration provides a direct electrical connection or grounding path between the pipe and the grounding lug. In certain preferred versions, the various components are configured such that one or more threaded fasteners extend through apertures provided in the grounding lug and apertures provided in the base plate. Corresponding female receiving fasteners are provided along an underside of a workpiece support member. Upon appropriate alignment of the fasteners, components and/or apertures, the threaded apertures (positioned under the base plate) extend through the grounding lug and base plate and are threadedly engaged with the corresponding female fasteners in the pipe support member. It is also contemplated that such fasteners may be integrally formed with the grounding lug. It will be appreciated that the present invention includes embodiments in which the grounding lug 310 is integrally formed with the base plate 220. The grounding lug 310 may also include an angled or recessed region 316 proximate the distal end 314 for promoting engagement and retention of a welding cable clamp. It is also contemplated that a bulbous or enlarged region could be formed or provided along the distal end 314.

Preferably, the grounding lug 310 defines an aperture or slotted access opening 320 near the proximal end 312 of the lug 310. The aperture 320 is preferably sized and shaped to fittingly receive and engage the chain 250. That is, the aperture 320 is preferably in the form of an elongated opening having a width span illustrated as W in FIG. 11 that is less than the maximum length of a chain post 251 yet greater than a first chain span $S_1$ in FIG. 8 as measured from an outer face of one plate 252a to an oppositely directed face of another plate 252b across from the plate 252a such as shown in FIG. 8. The aperture 320 of the grounding lug 310 has a length span generally depicted as L in FIG. 11 that is greater than a second chain span $S_2$ as measured from one edge of a plate 252 such as plate 252a to an opposite edge of the plate 252a as shown in FIG. 8. This configuration enables convenient means for securing the chain 250 at any one of numerous positions along the length of the chain along the underside of the plate 220. Upon use of the vise stand, the chain 250 is positioned within the aperture 320 and the chain 250 is positioned relative to the grounding lug 310 such that a post 251 of the chain 250 is oriented parallel to the width span W of the aperture 320, and the post 251 contacts the grounding lug 310 and thus precludes withdrawal of the chain through the aperture 320. This engagement configuration is depicted in FIG. 8.

The grounding lug 310 also preferably comprises one or more outwardly extending end regions 322 which are sized and shaped to capture and seat a post 251 of the chain 250. As depicted in FIGS. 8, 11, and 12, the end regions 322 extend from the proximal end 312 and also preferably diverge away from the portion of the grounding lug 310 between the proximal end 312 and the distal end 314. Specifically, end regions 322 diverge away from the plane of the proximal region 312 by an angle A as shown in FIG. 12. Preferably also provided in combination with the opening 320 is a recessed receiving region 321 which is preferably sized and shaped to seat and receive a chain post 251. The combination of the outwardly extending end regions 322 and the recessed receiving region 321 provides secure engagement, increased contact, and electrical communication between an appropriately oriented chain and the grounding lug 310. It is also preferred that the intermediate region 315 of the grounding lug 310 also diverge away from the plane of the proximal region 312 by an angle B as shown in FIG. 12. The angles A and B can be the same or different, and generally range from about 20° to about 70°. However, it will be appreciated that the invention includes grounding lugs 310 having different configurations and angles for A and B, which could be less than or greater than the range of angles noted herein.

Figure 9:
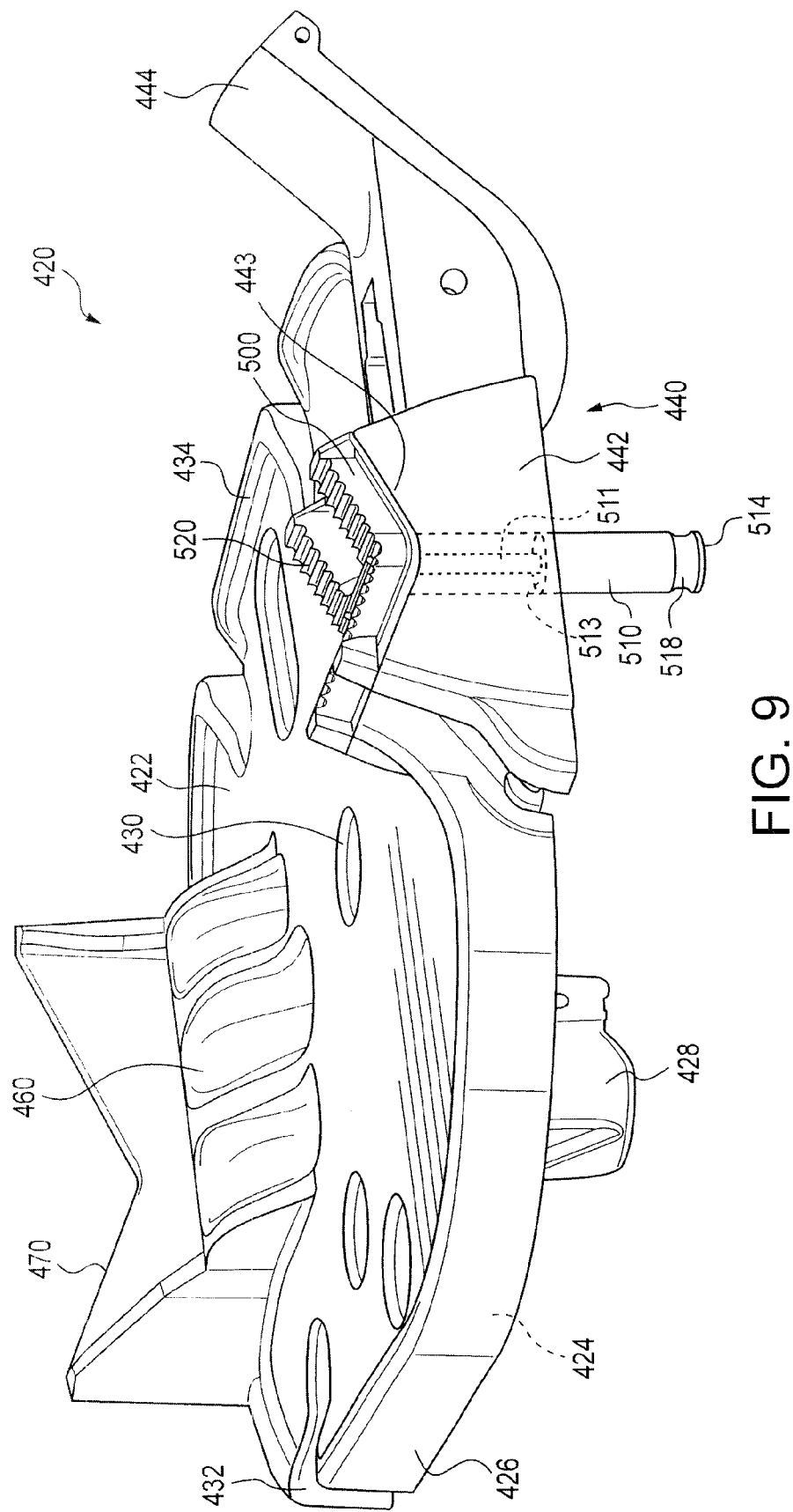
FIG. 9 is a perspective view of another base plate depicting yet another preferred embodiment grounding lug associated with a pipe support member in accordance with the present invention.
Figure 10:
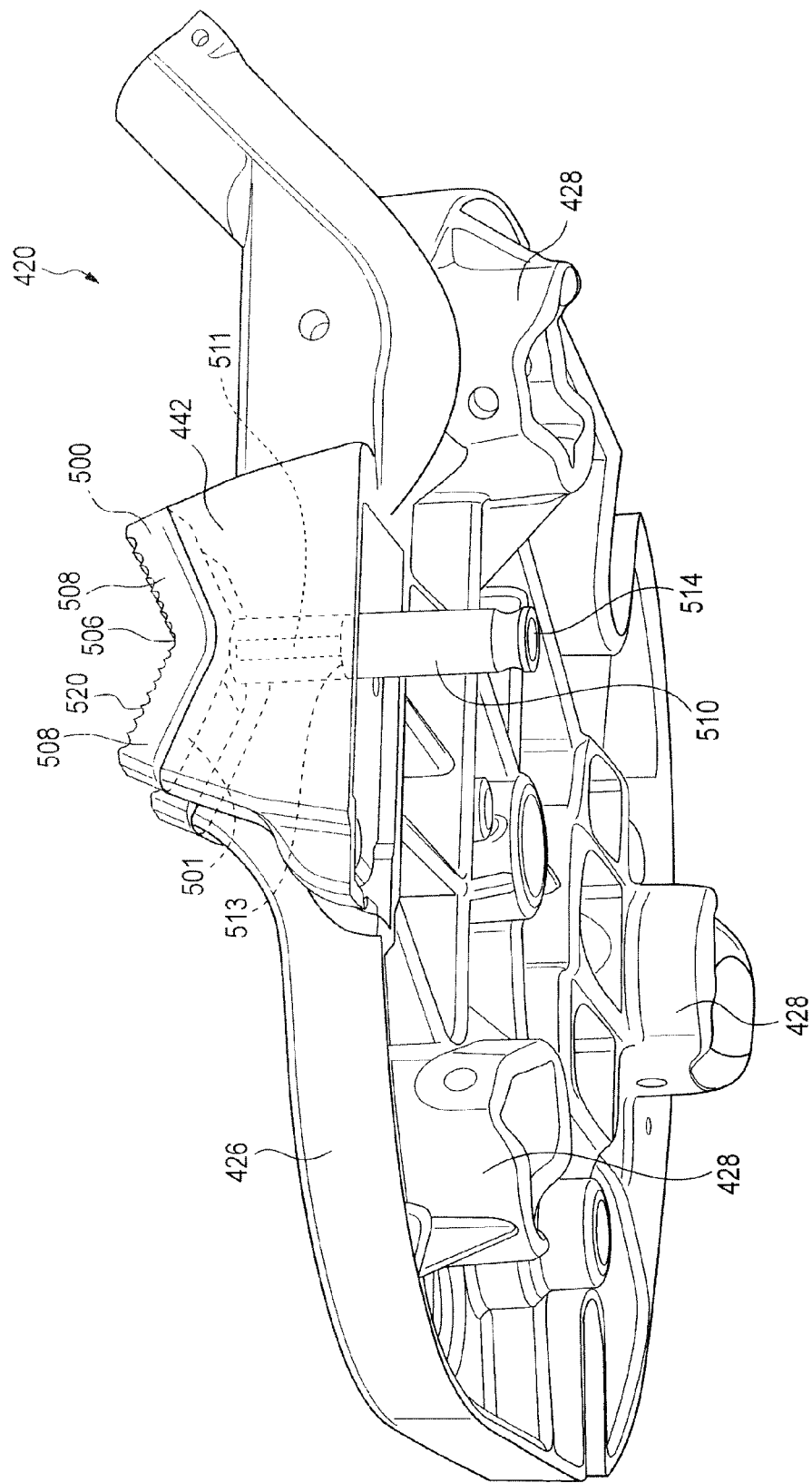
FIG. 10 is a perspective view of the base plate, pipe support member, and grounding lug depicted in FIG. 9, illustrating the underside of the base plate.

FIGS. 9 and 10 illustrate another base plate 420 and a preferred embodiment pipe support member 500 including another preferred embodiment grounding lug 510 extending therefrom. Generally, the base plate 420 corresponds to the previously described base plate 20 described in conjunction with FIGS. 1 and 2 and defines a work face 422, an oppositely directed underside 424, and an edge 426 extending between the work face 422 and the underside 424. The base plate 420 defines one or more apertures 430 and edge slots 432, and may include a lip 434 extending at least partially around the base plate. The base plate 420 includes vise provisions 440 which include a vise base 442 and a handle base 444. The vise base 442 defines an upwardly directed face 443. The base plate 420 also comprises a pipe bender 460 and an upright 470. Disposed along the underside of the base plate 420 are a collection of leg receptacles 428.

Provided in association with the base plate 420, is a pipe support member 500. The pipe support member is preferably sized, shaped, and configured to engage and contact the face 443 of the vise base 442. The pipe support member 500 includes a central member 506 and one or more lateral members 508, as previously described in association with the pipe support members 100 and 100a depicted in FIGS. 2-7. The pipe support member 500 includes a grounding lug 510, 511 that preferably extends downward from an underside 501 of the pipe support member 500. In the version depicted in FIGS. 9 and 10, the grounding lug includes a proximate portion 511 extending from the underside 501 of the pipe support member 500 and a distal portion 510 extending from the proximate portion 511. The proximate portion 511 extends between the underside 501 and the distal portion 510. The distal portion 510 is preferably in the form of a cylinder, although the invention is not limited to such configurations or shapes. The distal portion 510 of the grounding lug defines a distal end 514 at which a grounding cable clamp can be attached. The distal end 514 can be in a wide variety of forms, however in this version, it is preferred that the distal portion 510 define a recessed region, or groove 518 extending circumferentially around the distal end 514. The grounding lug generally comprised of proximate and distal portions 511, 510, respectively, can be integrally formed as part of the pipe support member 500 or can be in the form of separate and non-integral components. It is also contemplated that one or both portions 511, 510 of the grounding lug could also function or be configured to serve as fasteners for retaining the pipe support member 500 to the base plate 420. That is, the distal portion 510 of the grounding lug could be in the form of a threaded fastener used to retain the pipe support member 500. The fastener could include an end shaped as described to thereby receive a welding clamp.

The pipe support member 500 can be integrally formed as part of the base plate 420 or can be separate and removable therefrom. If the pipe support member 500 is removable from the base plate 420, one or more apertures are provided in the vise base 442 through which the grounding lug 510 extends upon positioning the pipe support member 500 on the vise base 442. The pipe support member 500 defines an upwardly directed face 520 that, as previously described, can include one or more serrations or other texturing elements.

It will be understood that the present invention can be provided in a wide array of support members, work stands, or other support assemblies such as base members used in work stands. For example, the invention can be incorporated in vise stands and in particular pipe vise stands and in bench vises. The present invention is not limited to use with any specific type of vise. That is, although the stands described herein are provided with chain vises, it is contemplated that other types of vises could be used besides chain vises. For example, the invention can be used with yoke vises, chain vises, and so forth. Specific non-limiting examples of suitable pipe vises which may include or use aspects of the present invention include portable TRISTAND® vise models 40-A, 425, and 460; bench chain vise models BC210, BC410, BC210P, BC410P, BC510, BC610, BC1310, BC2A and BC4A; stand chain vise model 560; bench yoke vise models 21, 22, 23, 25, and 27; portable chain and yoke vise models 39 and 640; and pipe welding vise models 461, 462, 463, and 464 all available from Ridge Tool of Elyria, Ohio. Furthermore, the invention is not limited to use with vises. For example, the invention can be provided in conjunction with pipe stands such as V-head pipe stand models VJ-98 and VJ-99; a ball transfer head stand model BTH-9; roller head stand models RJ-98 and RJ-99; a conveyor head stand model CJ-99; adjustable head stand models 46 and 92; a support stand model 965; an adjustable roller stand model AR99; and a large diameter stand model RJ-624, all available from Ridge Tool. Examples of suitable bench vises with which the invention can be used include F-series vises model numbers F-45, F-50, and F-60 and related accessories therefor, all available from Ridge Tool. It will be understood that the foregoing is provided merely to illustrate the wide array of support members, work stands, or other support assemblies which may feature, encompass and/or use one or more aspects of the present invention.

Furthermore, it is also contemplated that the invention is not limited to stands such as work stands or pipe vise stands as generally described herein. For example, the various grounding lug configuration and strategies described herein could be provided in conjunction with bench vises, bench or table mounted chain vises, or with other vise provisions not in a stand configuration.

In all of the support members, work stands, or other support assemblies incorporating the present invention, it is preferred that the one or more workpiece contacting or workpiece engaging faces include texturing, serrations, or roughening to promote gripping of a workpiece. Preferably, the workpiece contacting face(s) includes one or more serrated regions.

Many other benefits will no doubt become apparent from future application and development of this technology.

All patents, published applications, and articles noted herein are hereby incorporated by reference in their entirety.

It will be understood that any one or more feature or component of one embodiment described herein can be combined with one or more other features or components of another embodiment. Thus, the present invention includes any and all combinations of components or features of the embodiments described herein.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A work stand comprising:
 a base plate defining a work surface, an oppositely directed underside, and a vise base;
 a plurality of extendable legs engaged with the base plate;
 a grounding lug defining a proximal end, a distal end, and an intermediate portion extending therebetween, the grounding lug secured to the base plate along the proximal end of the grounding lug, the grounding lug defining an aperture near the proximal end of the grounding lug that is sized and shaped to fittingly engage a chain adapted for use with the vise base.

2. The work stand of claim 1 wherein the grounding lug is secured along the underside of the base plate.

3. The work stand of claim 1 wherein the proximal end of the grounding lug includes at least one outwardly extending end region which is sized and shaped to capture and seat a post of the chain.

4. The work stand of claim 3 wherein the at least one outwardly extending end region of the grounding lug and the intermediate portion of the grounding lug diverge away from one another.

5. The work stand of claim 1 wherein the grounding lug is non-integral and removable from the base plate.

6. The work stand of claim 5 wherein the grounding lug is secured to the base plate by at least one threaded fastener.

7. The work stand of claim 5 wherein the grounding lug includes fastener provisions to thereby engage the grounding lug to the base plate.

8. The work stand of claim 1 wherein the grounding lug is integral with the base plate.

9. The work stand of claim 1 wherein the grounding lug defines a recessed receiving region which is sized and shaped to seat and receive a post of the chain.

10. The work stand of claim 1 wherein the grounding lug defines a recessed region near the distal end of the grounding lug for engagement and retention of a welding cable clamp.

11. The work stand of claim 1 further comprising:
wherein the plurality of legs are positionable between an extended position and a retracted position.

12. A work stand comprising:
a base plate defining a work surface and an oppositely directed underside;
a plurality of legs engaged to the base plate extending from the underside and positionable between an extended position and a retracted position;
a grounding lug extending from the underside of the base plate;
wherein the base plate includes a vise base and a vise chain, the base plate defining a first aperture extending through the base plate between the work surface and the underside, the grounding lug defining a second aperture, the grounding lug positioned relative to the base plate so that the first and second apertures are aligned, the vise chain extending through the first and the second apertures.

13. The work stand of claim 12 wherein the grounding lug extends from the underside of the base plate at an angle of from about 20° to about 70°.

14. The work stand of claim 12 wherein the grounding lug is non-integral and removable from the base plate.

15. The work stand of claim 14 wherein the grounding lug is secured to the base plate by at least one threaded fastener.

16. The work stand of claim 12 wherein the grounding lug is integral with the base plate.

17. The work stand of claim 12 wherein the vise chain includes a plurality of posts, the second aperture sized such that the chain can be oriented so that a post of the vise chain contacts the grounding lug and precludes withdrawal of the chain through the second aperture.

18. The work stand of claim 12 further comprising:
vise provisions including a chain, a vise base, and an adjustment assembly for taking up slack in the chain; and
a workpiece support member disposed on the vise base, the workpiece support member defining a generally upwardly directed face and an opposite face contacting the vise base.

19. The work stand of claim 18 wherein the grounding lug is non-integral with respect to the workpiece support member.

20. The work stand of claim 19 wherein the grounding lug includes a threaded region and the grounding lug threadedly engages the workpiece support member to the vise base.

21. The work stand of claim 19 wherein the workpiece support member defines a female receiving fastener, the base plate defines at least one aperture, and the grounding lug defines at least one aperture, the workpiece support member aligned with the base plate such that the female receiving fastener is aligned with the aperture defined in the base plate and the grounding lug aligned with the base plate such that the aperture in the grounding lug is aligned with the aperture defined in the base plate, the work stand further comprising a threaded fastener extending through the aperture in the grounding lug, through the aperture in the base plate, and threadedly engaged with the female receiving fastener in the workpiece support member.

* * * * *